United States Patent [19]

Boyd et al.

[11] 4,267,555
[45] May 12, 1981

[54] ROTATABLE RASTER SCAN DISPLAY

[75] Inventors: Clay E. Boyd, Austin; John C. Jones, Georgetown; Joanne L. Mumola, Austin, all of Tex.

[73] Assignee: International Business Machines Corporation, Armonk, N.Y.

[21] Appl. No.: 53,483

[22] Filed: Jun. 29, 1979

[51] Int. Cl.³ .............................................. G08B 5/36
[52] U.S. Cl. ................................. 340/748; 315/364; 358/254; 340/720; 340/727
[58] Field of Search ............... 340/720, 724, 731, 744, 340/748; 358/254; 315/364

[56] References Cited

U.S. PATENT DOCUMENTS

| | | | |
|---|---|---|---|
| 2,404,030 | 7/1946 | Browne | 315/399 |
| 2,428,928 | 10/1947 | Cain | 340/720 X |
| 2,468,714 | 4/1949 | Leverene | 340/720 X |
| 3,676,850 | 7/1972 | Goldman et al. | 340/748 X |
| 4,167,757 | 9/1979 | Kono et al. | 358/254 |

FOREIGN PATENT DOCUMENTS 624025  5/1949  United Kingdom .

OTHER PUBLICATIONS

Klein; Cathode-Ray Tube Rotating Apparatus; IBM Tech. Discl. Bul.; vol. 18, No. 11, Apr. 1976, p. 3548.

*Primary Examiner*—David L. Trafton
*Attorney, Agent, or Firm*—John W. Henderson, Jr.

[57] ABSTRACT

Apparatus for rotating a cathode ray tube (CRT) which is operated as a graphic display through 90 degrees such that different size pages of data may be displayed while minimizing the control circuitry required. The display deflection yoke is fixedly attached to a support frame for the display. The CRT is rotatably mounted within the yoke and held by annular thrust bearing which allows the CRT to be rotated 90 degrees. A switch is actuated by the rotation of the CRT to select between sets of control resistors to control the raster scan of the CRT in accordance with its orientation.

3 Claims, 5 Drawing Figures

ROTATABLE RASTER SCAN DISPLAY

BACKGROUND OF THE INVENTION

1. Field of the Invention

This invention relates to display systems, and more particularly to raster scan display systems having a rotatable CRT.

2. Description of the Prior Art

Rotation is a known technique with stroke displays which enables the system to display the text page outline in either of the two orientations. On a stroke display or gas panel display this rotation is not unreasonably difficult since both displays may be addressed with an X-Y coordinate and rotating the display implies simply interchanging X and Y. However, this is not true for a typical raster scan display.

The raster technique is used in most video display monitors and in virtually all television receivers. As the name implies, the electron beam scans the raster at a fixed rate, normally, left to right and top to bottom. This is known as horizontal scanning. Vertical scanning, on the other hand implies scanning from bottom to top and left to right.

Displaying textual data on a raster monitor is a well known technique where the character is sliced into pieces of video bits which are displayed on adjacent scan lines. In a progressively scanned system, the electron beam traces the characters by rows in ascending order. The rows are of a fixed length determined by the width of the display screen and the number of text lines is fixed by the height of the display screen. Since display screens are rectangular in shape it becomes desirable to rotate the display such that the vertical side is longer for displaying longer documents such as legal size documents, or such that the horizontal side is longer for displaying extra wide documents. Rotation of the display replaces horizontal scanning with vertical scanning where the yoke is rotated, or vice versa. For fixed pitch characters, vertical scanning is not more difficult than horizontal scanning. However, proportionally spaced characters are much more complex with vertical scanning because the characters on adjacent lines do not line up. This implies that text pointers are needed for each line of text and that the information throughput of the character generator is less. Further since both horizontal and vertical scanning are required there is the attendant cost of dual implementation.

SUMMARY OF THE INVENTION

Apparatus is provided for displaying textual material having a greater dimension along first axis and a lesser dimension along a second axis on a raster scan display having a greater dimension along one axis and a lesser dimension along the other axis such that the display may be rotated through 90 degrees until its axis of greater dimension corresponds to the greater dimension of the textual material. The display yoke is fixedly attached to a support frame. A cathode ray tube is rotatably mounted within the yoke and is held in place by an annular thrust bearing which allows the CRT to be rotated 90 degrees. A control switch is actuated by the rotation of the CRT to selectively control horizontal scan line length and the sweep length to conform to the orientation of the CRT.

DESCRIPTION OF THE PREFERRED EMBODIMENT

Figure 1:
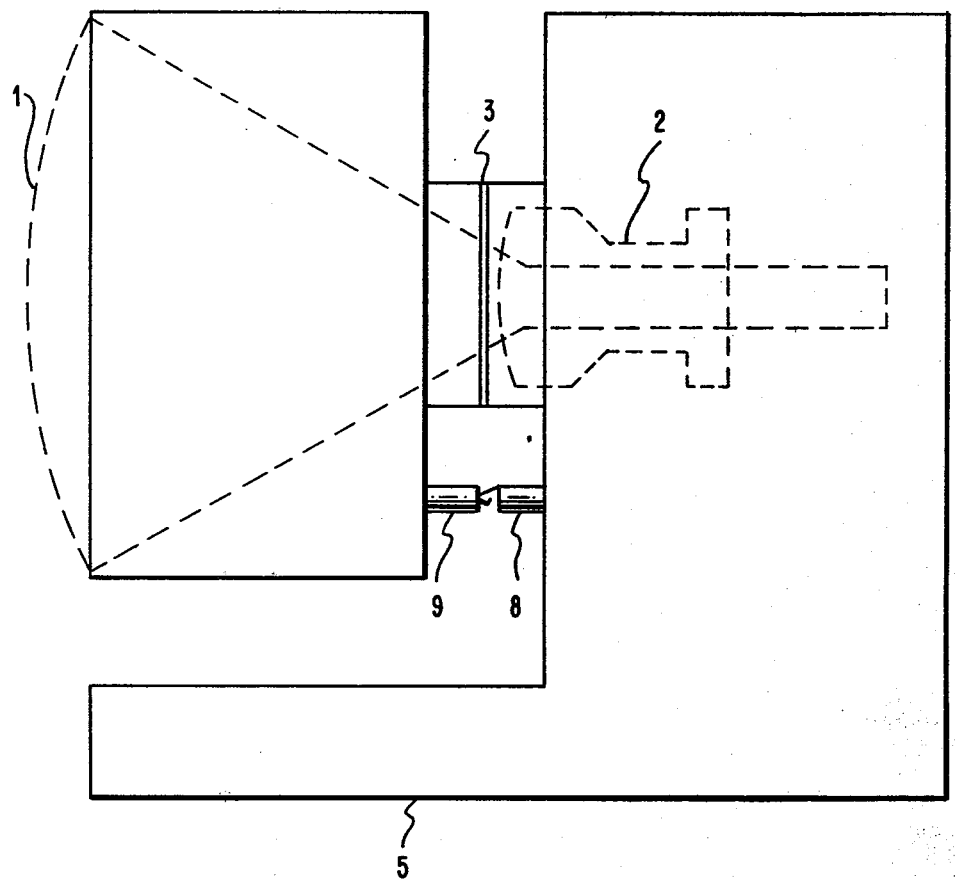
FIG. 1 is a diagrammatic side view of a CRT display device.
Figure 2:
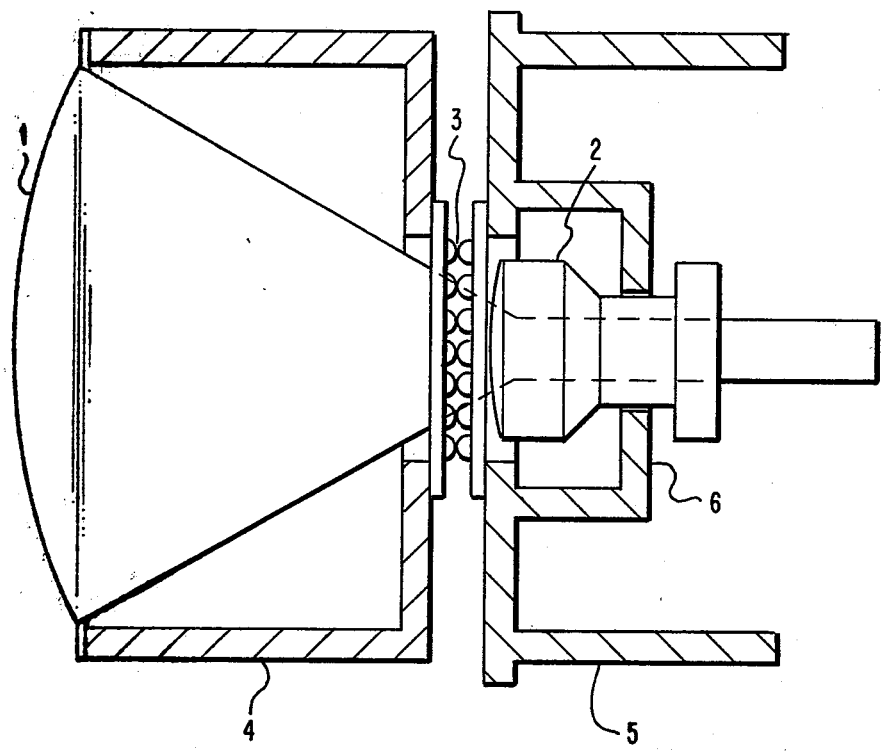
FIG. 2 is a cross-section plan view of the CRT display device of FIG. 1.
Figure 3:
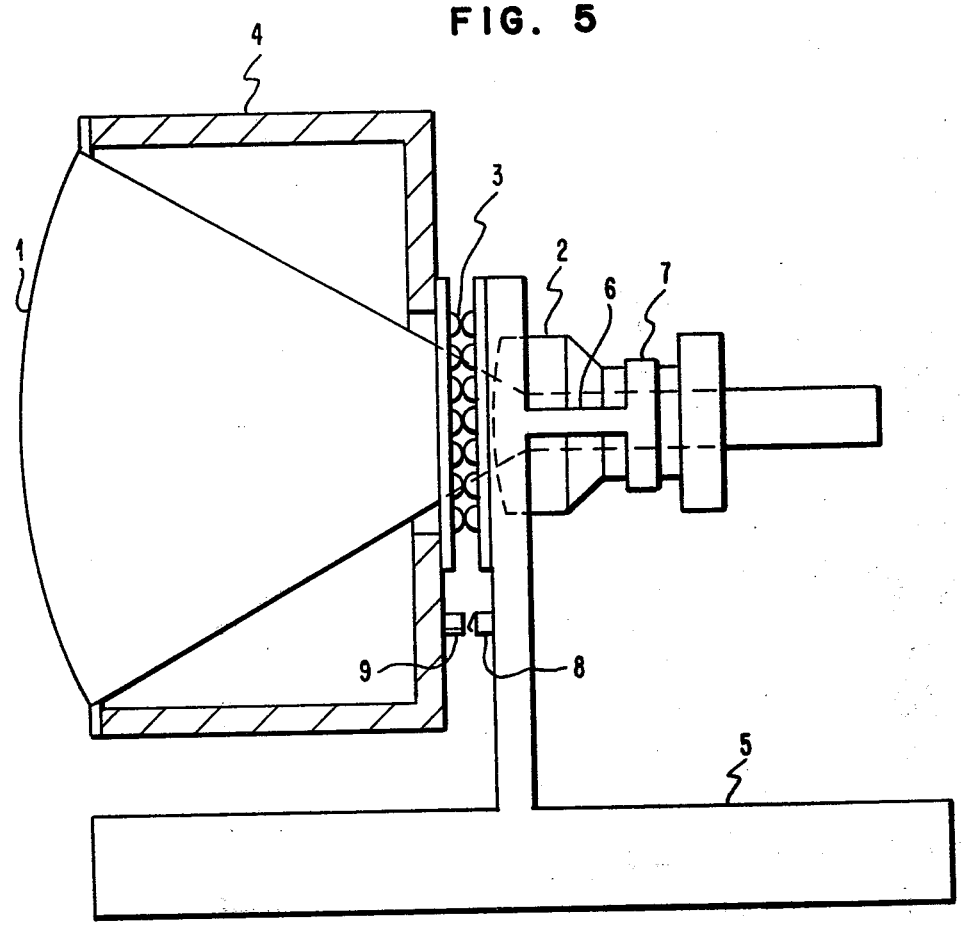
FIG. 3 is a cross-section side view of the CRT display device of FIG. 1.

Referring to FIG. 1 there is shown a side elevation of a display system of the type generally used in text processing systems as data entry/revision terminals having a cathode ray tube (CRT) display 1, the face of which may have characters and symbols written thereon by an electron beam under the control of a deflection yoke 2. FIGS. 2 and 3 respectively show a cross-sectional plan view and side view of the display system. The deflection yoke 2 is annular and mounts around the neck of the CRT 1. A strap 7 holds the sections of the deflection yoke 2 together. The deflection yoke 2 is fixedly attached to the cabinet 5 of the display system. An annular thrust bearing 3 has the CRT 1 passed through its opening and has one end fixedly attached to the housing 4 for the head of the CRT 1 and the other end fixedly attached to the cabinet 5. A switch 8 is attached to the cabinet 5 and a switch actuator 9 is attached to the display head housing 4.

Figure 5:
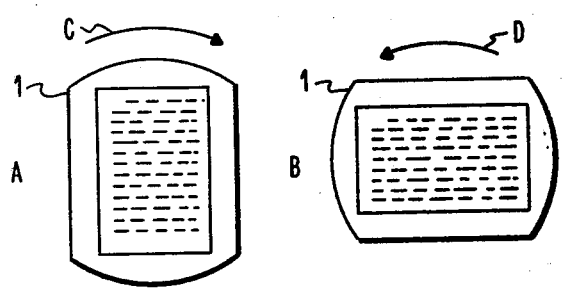
FIG. 5 is a diagrammatic front view showing the orientations of the display device.
Figure 4:
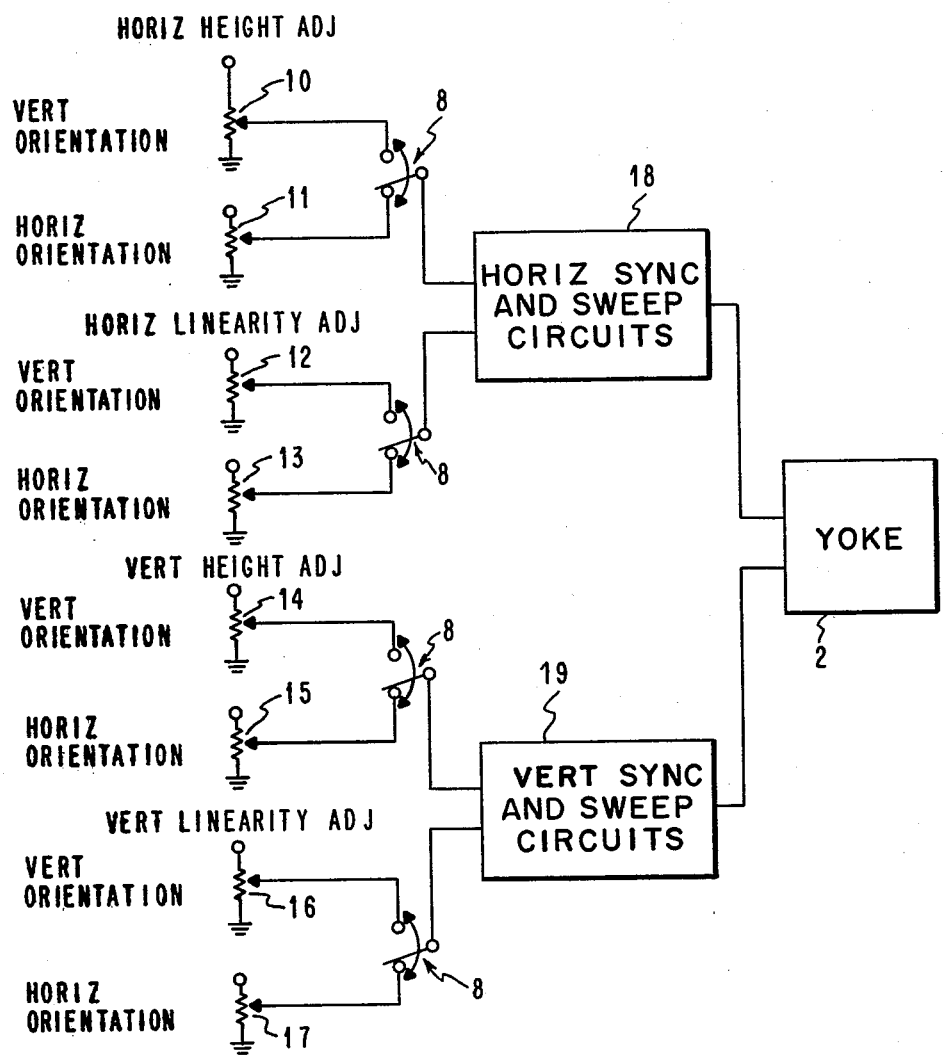
FIG. 4 is a control circuit diagram for the display device.

Referring to FIG. 4 the control circuit for the deflection yoke 2 is shown. The horizontal and vertical sync and sweep circuits 18 and 19 are of the type well known in the prior art and may be constructed using available standard integrated circuit modules. The circuits are provided with inputs that require resistors to define the horizontal and vertical length and height of the sweeping electron beam. Switch 8 is a bank of single pole-double throw switches that select the control resistors for the orientation of the display screen. FIG. 5 shows the two orientation positions for the display screen. In position A the screen 1 is orientated such that the longer dimension is vertical. In this position long documents such as legal size documents may be displayed on the screen. Resistors 10, 12, 14, and 16 are selected by switch 8 to control the sweep circuits when the display screen is in position A.

In position B the display screen is orientated such that the longer dimension is horizontal. In this position extra wide documents may be displayed, for example a legal size page with text lines parallel to its longer side. Resistors 11, 13, 15, and 17 are selected by switch 8 to control the sweep circuits when the display screen is in position B. It is to be noted that in both position A and position B the CRT electron beam sweep is controlled by the same set of sweep circuits with the exception of the control resistors. In the preferred embodiment, horizontal scanning is employed with the display screen in either of the orientation positions. However, it is a designers choice, and vertical scanning could have been selected.

As a collateral matter, it is to be noted that changing the orientation of the display screen will cause a change in the appearance of characters on the screen if the dot matrix character font used provides different horizontal and vertical dot densities, i.e., dots per inch. Therefore, it may be necessary to design a character font which provides for different page sizes and page orientations. A technique for designing such a character font may be found in an article entitled "Universal Font For Vertical Or Horizontal Page Orientations", by C. E. Boyd, K. R. Demke and J. L. Mumola, IBM TECHNICAL DISCLOSURE BULLETIN, Vol. 21, No. 9, February 1979, pp. 3489-3491.

In operation, to change the orientation of the display screen 1 from position A to position B, the operator grasps the display head housing 4 and rotates it in the direction of arrow C. A detent is provided in the thrust bearing 3 to inhibit rotation of the display head housing 4 past the horizontal position B. The switch 8 is engaged by the switch actuator 9 to flip the bank of contacts such that Resistors 11, 13, 15, and 17 control the sweep circuits. To return the display to position A the display head is rotated in the direction of the arrow D until a detent is engaged in thrust bearing 3. This disengages the switch actuator 9 from the switch 8. The switch 8 is toggled by the removal of the actuator 9 such that the contacts place Resistors 10, 12, 14 and 16 in the sweep control circuit and remove Resistors 11, 13, 15 and 17 from the circuit. The resistor values determine the length of the sweep lines on the display and the number of sweeps across the display screen as well as the thickness of the electron beam and distance between sweeps.

While there has been illustrated and described what is considered to be the preferred embodiment of the present invention, it will be obvious to those skilled in the art that variations and modifications may be made to the invention. For example, vertical scanning may be employed instead of horizontal scanning or power operated means may be provided for rotating the display CRT instead of manual rotation. The appended claims are intended to cover those variations and modifications which do not depart from the spirit and scope of the invention.

What is claimed is:

1. In apparatus displaying text material having a format with a longer dimension along a first axis and a shorter dimension along a second axis on a CRT having a longer dimension along one axis and a shorter dimension along the other axis, means for switching the apparatus to display text material having a format with a shorter dimension along said first axis and a longer dimension along said second axis comprising:
   means for effecting rotation of said CRT substantially 90 degrees with respect to its yoke;
   means for altering the length of each scan line of said CRT in response to said rotation; and
   means for altering the length of the sweep of said CRT through successive scan lines in the opposite sense to the alteration in scan line length in response to said rotation.

2. The means for switching of claim 1 wherein said means for effecting rotation includes detent means located substantially 90 degrees apart for inhibiting rotation of said CRT beyond the location thereof.

3. The means for switching of claim 1 or claim 2 wherein said means for altering the length of each scan line includes switchable means operative in response to the rotation of said CRT to selectively increase or decrease the scan line length, and said means for altering the length of the sweep includes switchable means operative in response to the rotation of said CRT to selectively increase or decrease the number of scan lines.

* * * * *